United States Patent
Büchler

(10) Patent No.: US 6,266,303 B1
(45) Date of Patent: Jul. 24, 2001

(54) APPARATUS FOR READING OR WRITING OPTICAL RECORDING CARRIERS

(75) Inventor: Christian Büchler, Villingen-Schwenningen (DE)

(73) Assignee: Deutsche Thomson-Brandt GmbH, Villingen-Schwenningen (DE)

( * ) Notice: Subject to any disclaimer, the term of this patent is extended or adjusted under 35 U.S.C. 154(b) by 0 days.

(21) Appl. No.: 09/202,172

(22) PCT Filed: Jun. 23, 1997

(86) PCT No.: PCT/EP97/03276

§ 371 Date: Dec. 9, 1998

§ 102(e) Date: Dec. 9, 1998

(87) PCT Pub. No.: WO98/01855

PCT Pub. Date: Jan. 15, 1998

(30) Foreign Application Priority Data

Jul. 6, 1996 (DE) ............................................. 196 27 383

(51) Int. Cl.⁷ ..................................................... G11B 7/09
(52) U.S. Cl. ..................................... 369/44.29; 369/44.35; 369/44.41; 369/60.01
(58) Field of Search ............................. 369/44.41, 44.42, 369/44.27, 44.28, 44.29, 44.32, 44.34, 44.35, 47, 54, 60.01

(56) References Cited

U.S. PATENT DOCUMENTS

| | | | |
|---|---|---|---|
| 4,785,441 | 11/1988 | Tanaka et al. | 369/44 |
| 5,696,752 | * 12/1997 | Hajjar et al. | 369/124.11 |
| 5,740,141 | * 4/1998 | Sano et al. | 369/59.15 |

FOREIGN PATENT DOCUMENTS

| | | |
|---|---|---|
| 63-131334 | 6/1988 | (JP) . |
| 2-108244 | 4/1990 | (JP) . |
| 2-108245 | 4/1990 | (JP) . |
| 3-144923 | 6/1991 | (JP) . |

OTHER PUBLICATIONS

Patent Abstracts of Japan, vol. 015, No. 372 and JP 3–144923.
Patent Abstracts of Japan, vol. 014, No. 325 and JP 2–108245.
Patent Abstracts of Japan, vol. 014, No. 325 and JP 2–108244.
Patent Abstracts of Japan, vol. 012, No. 388 and JP 63–131334.

* cited by examiner

*Primary Examiner*—Muhammad Edun
(74) *Attorney, Agent, or Firm*—Joseph S. Tripoli; Paul P. Kiel

(57) ABSTRACT

The invention concerns an apparatus for reading or writing optical recording carriers, the apparatus using the differential phase detection process for tracking purposes. This process exhibits shortcomings when optical recording carriers of different pit depths are to be used. The object of the invention is to design an apparatus of this type which can also be used with said optical recording carriers. This object is achieved in that delay members are disposed between the photodetector and phase detector. The apparatus according to the invention is used as a playback or recording apparatus for optical recording carriers, such as CDs, CD-ROMs, CD-Is, CD-Rs, DVDs, DVD-ROMs, DVD-Rs, etc.

11 Claims, 2 Drawing Sheets

APPARATUS FOR READING OR WRITING OPTICAL RECORDING CARRIERS

Figure 1:
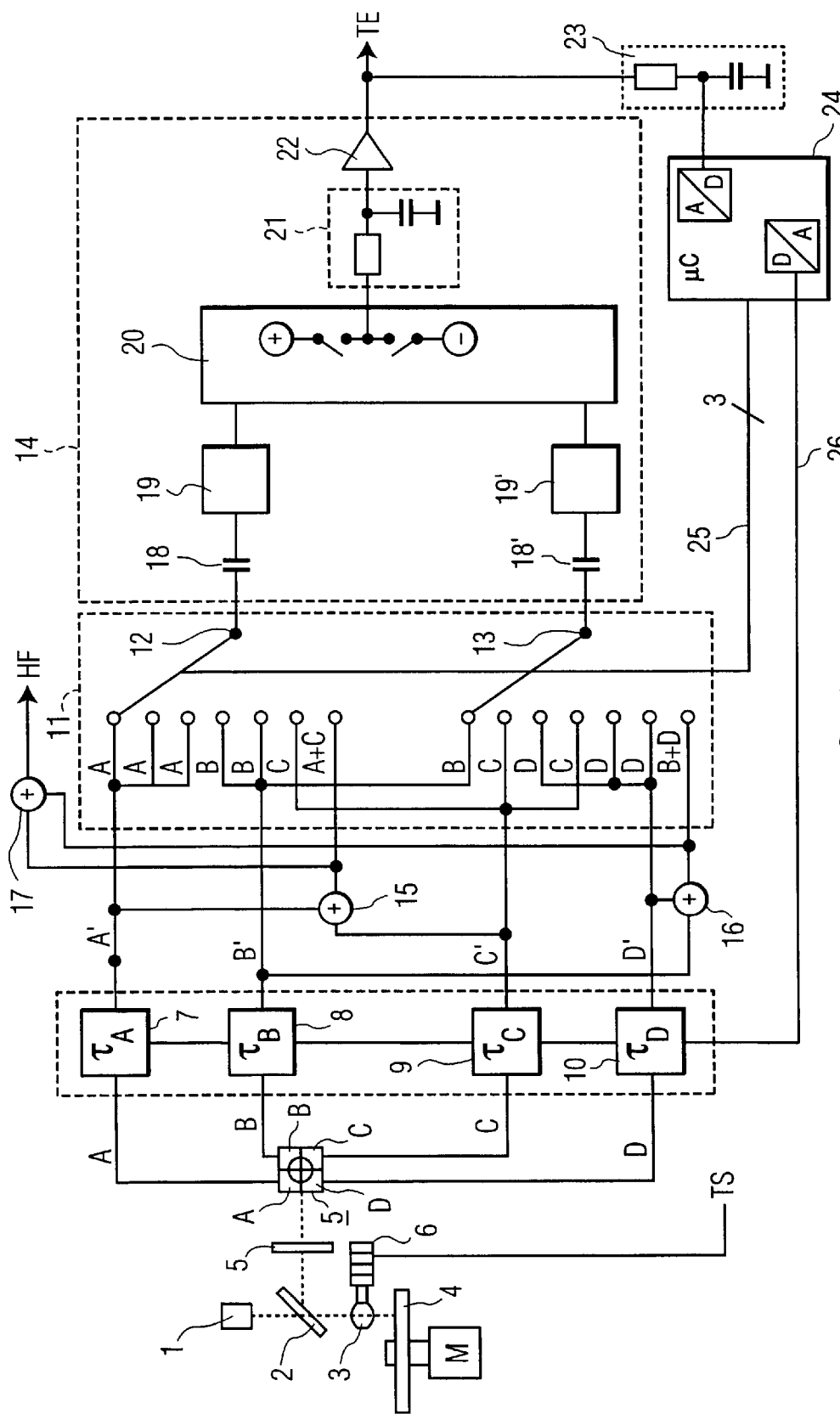

The present invention relates to a device for reading from and/or writing to optical recording media according to the preamble of claim 1.

A device of this type is disclosed in U.S. Pat. No. 4,497,048. In this known device, there is provision of a photodetector which is divided into four areas. Tracking information is obtained by combining the signals from two areas in each case to form a summation signal and by ascertaining a phase difference between the first and the second summation signal such that it is not necessary to acquire the amplitude of the reproduced signal. This device functions satisfactorily when the optical recording medium to be read out has a well-defined and constant geometry of the information-carrying layer. In particular, it is necessary that the depressions in the information-carrying layer which serve for information storage, the so-called pits, have a constant depth in relation to the wavelength of the light used for the read-out operation.

What is disadvantageous with the known device is the fact that only slight variations in the geometry of the pits are tolerated, and that larger deviations lead to errors in the formation of the tracking information. The result of this is that high error rates occur during the read-out of the optical recording medium or, in the extreme case, such a read-out becomes completely impossible.

The object of the present invention is to improve the known device to the extent that it can be used without any problems even for optical recording media having a different pit depth or pit geometry.

According to the invention, this is achieved by virtue of the fact that a delay element is assigned to at least one of the areas of the photodetector. This has the advantage that the areas of the photodetector can be temporally adjusted relative to one another. Since the photodetector receives an interference pattern which is caused by the pits arranged on the optical recording medium and may vary depending on the disk geometry and the track geometry (pit depth, etc.), on the type of disk and on manufacturing tolerances and also on the ageing of the laser scanner, the temporal relationship between the detector signals also varies. The temporal adjustment of the detector signals relative to one another which is possible according to the invention enables variations of this type to be compensated for. The temporal adjustment can in this case be carried out by means of a single delay element assigned to an area of the photodetector. However, significantly better adjustment is possible if a delay element is assigned to a plurality, or each, of the areas. The greatest flexibility is made possible if a delay element is assigned to each of the areas. If a delay element is assigned to all but one of the areas, then all of the areas provided with a delay element can be adjusted to that area without a delay element. It is also possible to combine the areas into groups, to assign a delay element to each group and to adjust the groups relative to one another. If an area consists of a plurality of individual areas, then a delay element can be assigned to each of these individual areas.

The delay elements can be set externally, for example during production of the device or when a device service is being carried out.

The invention provides for the presence of control means for setting the delay time of the delay element or elements. This has the advantage that the delay elements can be adjusted at any time. For example, adjustment can be carried out after each insertion of a new optical recording medium, at specific time intervals, for example during brief interruptions in the playback or writing operation of an optical recording medium, or at intervals which are suitably defined in a different way. One adjustment possibility consists in setting fixed delay times which are matched to the type of optical recording medium. The type of recording medium is in this case defined by the pit depth or the pit geometry, the track width or similar characteristic properties. What may be involved here are the known audio CD or new optical recording media having a high recording density (so-called DVD). It is likewise possible to vary the delay times in a type of "try-and-error method" with regard to the initial settings and to retain the new value when the tracking behaviour becomes better. If the tracking behaviour becomes worse, the delay times are reset to the preceding setting.

Provision is furthermore made for providing a phase detection means for detecting the phase angle of the signals emitted by the areas of the photodetector. This has the advantage that the adjustment is possible in an optimum manner since the exact phase angle is determined and, consequently, the delay times of the delay elements can be set exactly.

A further refinement of the invention makes provision of a circuit arrangement for applying a combination of the output signals of the areas to a phase angle detector. This has the advantage that the phase angles of the individual signals are evaluated by a single phase angle detector in that the signals of the individual areas of the photodetector are passed successively to the phase angle detector via the circuit arrangement. The circuit arrangement, for example a multiplexer, is advantageously installed in the device, with the result that the phase angle can be determined internally. Alternatively, this is advantageous for external determination of the phase angle since no unnecessarily high contact-making outlay is required in this case.

The circuit arrangement is advantageously switched by a control means, for example a microcontroller. According to the invention, it is likewise possible for switching to be effected according to a specific timing cycle or a clock triggered in a different way.

An advantageous development of the invention consists in the fact that the phase angle detector is the phase detector of the device. This has the advantage that an additional component is not necessary, and that functional groups of the device which are present in any case are optimally utilized.

In a development of the invention, provision is made for using a microcontroller which controls both the circuit arrangement and the setting of the delay time of the delay elements. This has the advantage that the control is carried out by means of a component which can be integrated in a cost-effective manner and can be adapted flexibly to changed boundary conditions. A logic circuit can also advantageously be used instead of a microcontroller.

An advantageous development of the invention consists in arranging a low-pass filter at the output of the phase detector. This has the advantage that an averaged DC signal is emitted in this way, thereby enabling automatic setting of the delay time even if the light beam scanning the optical recording medium is not following a track. The light pulses impinging on the detector do not in this case have to originate from a data. track; they may equally well be the signals which occur during random crossing of the tracks. In this way, rapid setting of the delay times is possible before the actual playback or recording operation begins. Since the phase detector is in any case not required for tracking during this time, a changeover between the functions of tracking and phase adjustment of the delay elements is also unnecessary.

The adjustment of delay elements of the device according to the invention which are able to be set is advantageously carried out according to the method described in claim 8. This has the advantage that phase differences caused by component properties are compensated for in a simple and cost-effective manner. After the method has been carried out, the device is provided with optimally adapted settings which are retained until, if appropriate, renewed adjustment is necessary or desirable. Not only can the method described be used during production for the purpose of optimum setting of the device, but it can also be employed for the purpose of adjustment during operation of the said device. The latter case can be implemented either manually, for example during servicing, or automatically, for example at specific time intervals.

Provision is made for setting those delay elements which are able to be set to a minimum delay time prior to the first method step of the method according to the invention. This has the advantage that the delay elements of the area with the chronologically last signal do not need to be altered, and that the maximum possible margin is available for those of the other delay elements.

The method according to the invention can also advantageously be employed when no track is actually being followed. In this case, the light pulses falling onto the detector originate from randomly crossed tracks. However, this is unimportant for setting the delay times by the method according to the invention, since the chronological sequence of the signals of the individual detector elements in the case of a rotating recording medium, but with the track regulating circuit still open, is virtually identical to that in the case of a closed regulating circuit. Optimum adjustment of the delay times can therefore be carried out by means of the method according to the invention even before the closing of the track regulating circuit, and this is something which significantly facilitates the subsequent closing of the track regulating circuit since no erroneous signals need be used for this purpose.

Claim 10 describes an embodiment of the method according to the invention which has the advantage of being particularly simple to execute. The device according to the invention is used as a playback or recording device for optical recording media such as, for example, CD, CD-ROM, CD-I, CD-R, DVD, DVD-ROM, DVD-R, etc.

The features cited in the individual claims can also expediently be employed in combination with one another. Further advantages of the device according to the invention and of the method according to the invention can be inferred from the following description.

Figure 2:
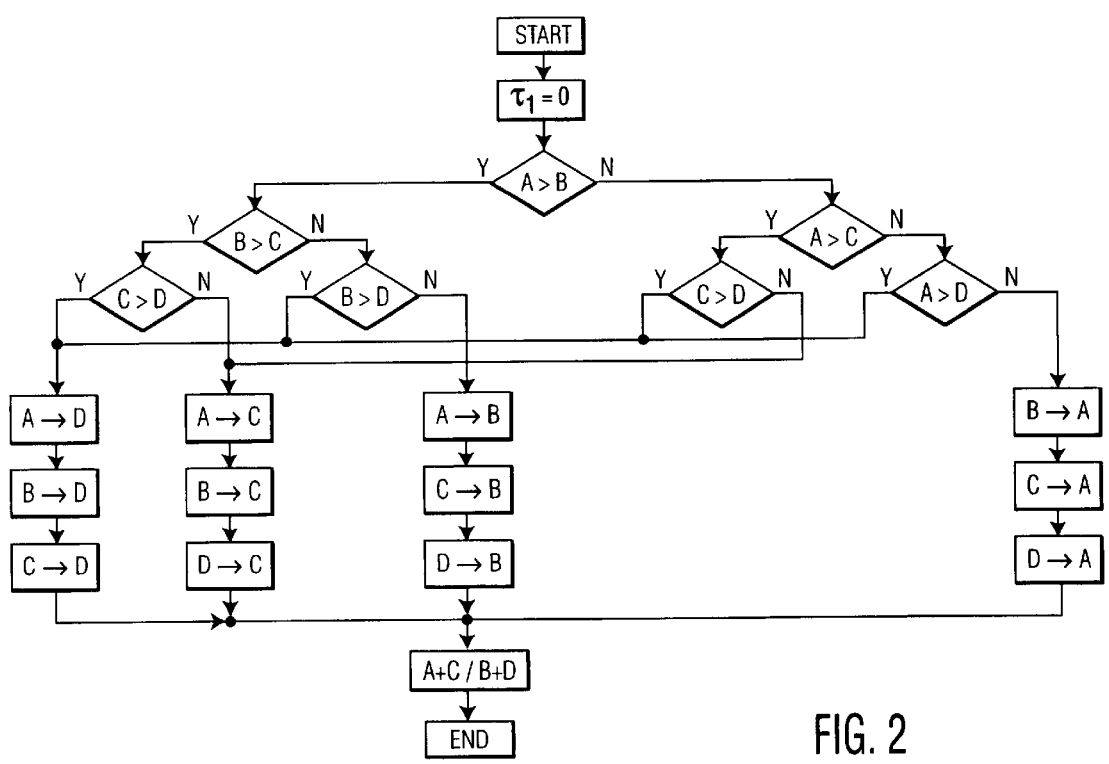

In the figures:

FIG. 1 shows a diagrammatic illustration of a device according to the invention, FIG. 2 shows a flow diagram relating to the method according to the invention.

FIG. 1 diagrammatically illustrates the device according to the invention. A light source 1 generates a light beam which passes through a semi-transparent mirror 2 and an objective lens 3 to fall onto the optical recording medium 4, from where it is reflected and passes through the objective lens 3 to the mirror 2, from where it is deflected onto the detector 5. The detector 5 is illustrated both in side view (on the left) and in a plan view rotated through 90° (on the right). This illustration reveals that the detector 5 consists of four areas A, B, C and D.

The optical recording medium 4 is caused to rotate by means of a motor M. Depressions, so-called pits, are arranged in a spiral track on the optical recording medium 4. The objective lens 3 serves to focus the light beam onto the optical recording medium 4. For this purpose, its distance from the optical recording medium 4 can be adjusted by means of a drive 6. In order to follow the track, that is to say for the purpose of tracking, the objective lens 3 can be displaced by the drive 6 in the radial direction with regard to the optical recording medium 4. A tracking signal TS is applied to the drive 6 for this purpose.

The output signals of the areas A, B, C and D are fed to delay elements 7, 8, 9 and 10, respectively. The delay elements 7, 8, 9 and 10 have delay times $\tau_A$, $\tau_B$, $\tau_C$, and $\tau_D$, respectively, which can be variably set. The delayed signals A', B', C' and D' are then present at the output of the delay elements 7, 8, 9 and 10, respectively. The said signals are fed to a circuit arrangement 11 whose two outputs 12 and 13 are fed to a phase detector 14.

The signals A' and C' are additionally fed to a first summer 15, whose output signal is fed to the circuit arrangement 11. The signals B' and D' are correspondingly fed to a second summer 16, whose output signal is likewise fed to the circuit arrangement 11. Furthermore, the output signals of the first summer 15 and of the second summer 16 are fed to a third summer 17, whose output signal represents the information signal HF. The further processing of the signal HF is not described here in greater detail since it is carried out in a manner which is known to a person skilled in the art.

The high-frequency component of the signal present at the output 12 is fed via a capacitor 18 to a converter 19. This converter 19 converts the analog input signal into a square-wave signal which has two possible states. This square-wave signal essentially corresponds to the information "light is falling onto the corresponding areas of the photodetector" or "no light is falling onto these areas", that is to say essentially corresponds to the analog input signal. Converters of this type are also referred to as "data slicers". The same applies correspondingly to the signal present at the output 13, which signal passes through the capacitor 18' and the converter 19'. The digitized signal emitted by the converters 19, 19' is fed to a phase comparator 20. If the phase angle of these input signals is identical, then the output signal of the phase comparator is 0; if a phase shift is present, then the output signal of the phase comparator 20 deviates from 0 in the positive or negative direction, specifically to a greater extent, the greater the temporal phase shift of the input signals is. The output signal of the phase comparator 20 is filtered by means of a low-pass filter 21, the cut-off frequency of which is approximately 50 kHz in the exemplary embodiment, and, having been amplified by means of an amplifier 22, is output as track error signal TE.

The signal TE is filtered in a further low-pass filter 23, the cut-off frequency of which is significantly lower, approximately 10 Hz in the exemplary embodiment, and is fed to a microcontroller 24 serving as control means. The microcontroller 24 controls both the circuit arrangement 11 via a line 25 and the delay elements 7 to 10 via a line 26. In the exemplary embodiment, the line 25 is a three-bit data line, while the line 26 is designed as a serial data line which transmits a control signal having the required resolution for each delay element 7, 8, 9 and 10.

In the exemplary embodiment, the circuit arrangement 11 is embodied as a multiplexer which connects two times seven inputs to two outputs. For the purpose of tracking, the inputs A+C and B+D each illustrated at the bottom in the drawing are connected to the outputs 12 and 13, respectively.

A deviation of the light beam, which reads out the optical recording medium 4, from the track centre causes the diffraction pattern falling onto the detector 5 to assume an asymmetrical distribution, as a result of which the signals A+C and B+D differ in terms of their phase angle. The output signal TE deviates from 0 to a greater extent, the greater the deviation of the light beam from the track centre and thus the shift in the phase angles of the signals A+C and B+D relative to one another. A regulator (not illustrated here) determines from this a desired tracking value, which is forwarded as the signal TS to the drive 6.

The delay elements 7 to 10 are provided in order to enable the signals emitted by the areas A, B, C and D to be temporally adjusted relative to one another. In this case, it is favourable to adjust the chronologically leading detector signals to the respective chronologically last signal, with the result that the relative phase shift with respect to one another becomes 0°. The best signal source quality with the least noise is then obtained for the track error signal TE. The method cited for determining the track error signal TE is called the "Differential Phase Detection" method (DPD). Since the delays that occur of the individual areas A to D of the detector relative to one another depend on the track depth and the geometry of the optical recording medium as well as on the linear scanning speed, which may vary for different types of optical recording media 4, the delay elements 7 to 10 are adjusted anew each time the optical recording medium is changed. Starting from the existent phase detector 14 for generating the track error signal TE by means of the DPD method from the summation signals A+C and B+D, the phase detector 14 is likewise used, with little outlay, for determining the order of the detector signals that appear from the areas A to D and for automatically adjusting the delay elements.

The chronological order of the detector signals of the areas A to D relative to one another is determined as follows: the signals A, B, C and D are compared with one another in order to be able to ascertain their phase angle with respect to one another. Six combinations are necessary in order to be able reliably to ascertain the signal appearing last in chronological order. The combinations are A and B, A and C, A and D, B and C, B and D and also C and D. The multiplexer of the circuit arrangement 11 enables all of the said comparison combinations to be switched to the inputs of the phase detector 14, depending on the switch position. The average DC voltage component of the output signal of the phase detector 14 can be determined with the aid of an additional low-pass filter 23, which, for example, can also be realized in the microcontroller 24, for example as an FIR filter. All of the delay elements 7 to 10 are firstly set to the smallest possible delay, that is to say $\tau_A=\tau_B=\tau_C=\tau_D=0$. If two input signals having a different phase angle are then passed to the phase detector 14 and the average DC voltage component at the output thereof is measured, a voltage deviating from zero is produced which is positive or negative depending on the phase angle. The decision concerning the phase angle can be made, for example, by means of a software comparator, the comparison level of which is 0 volts. Since it is initially intended to determine only the chronological order of the detector signals of the areas A to D by alternate interrogation, the interrogation can be carried out very rapidly. It is not necessary to wait for the settling of the low-pass filter 23. It is only necessary to identify the tendency (greater than or less than 0). After the chronologically last signal has been determined by means of alternate interrogation in a suitable form, by software or by a state machine, in the microcontroller 24 in the exemplary embodiment, the actual adjustment of the delay elements 7 to 10 is carried out.

This adjustment proceeds as follows: since the chronologically last signal has already been determined, it is easily possible, in three successive steps, to shift the other three, leading signals to the chronologically last signal. The criteria for successful shifting is once again the average DC voltage component at the output of the phase detector 14. The chronologically leading signals are compared one after the other with the chronologically last signal and the delay time $\tau$ of the respective leading signal is increased until the average DC voltage component at the output of the phase detector 14 reaches the value zero. This operation is carried out with the aid of the microcontroller 24, the voltage values being compared with a software comparator at 0 volts. The delay times $\tau_A$, $\tau_B$, $\tau_C$, and $\tau_D$ of the delay elements 7 to 10 can in this case be adjusted continuously or in small steps by the microcontroller 24. When all the signals have been shifted in such a way that their relative phase angle coincides, the track error signal TE is obtained from the sums of the signals A'+C' and B'+D'. The automatic adjustment method according to the invention has the advantage of compensating for influences on the temporal relationship between the detector signals, which depends on the disk geometry and the track geometry, the type of disk, manufacturing tolerances of the laser scanner, that is to say of the optical device (1 to 5), and also on the linear speed, that is to say the speed of the optical recording medium at the location where the light beam is currently situated.

Furthermore, it is possible, with little additional outlay (delay elements 7 to 10, circuit arrangement 11 and low-pass filter 23), with the inclusion of a logic circuit or, as illustrated, a microcontroller 24, to determine the temporal relationship between the detector signals of the areas A to D and to shift the temporal relationship between the said signals by means of the delay elements 7 to 10.

FIG. 2 shows a flow diagram of the method for automatically adjusting the delay elements 7 to 10 which are able to be set. After the start, all of the delay times $\tau_A$, $\tau_B$, $\tau_C$, and $\tau_D$ are set to zero. The phase angles of the signals A and B are subsequently compared with one another. The multiplexer is in this case in the switch position represented. If the signal A leads the signal B, then the left-hand branch is taken, otherwise the right-hand branch is taken. In each case, the lagging signal B and A, respectively, is then compared with the signal C. This corresponds to the fourth and to the second switch position, respectively, of the circuit arrangement 11 from the top. The signal which is determined to be a lagging one in this second comparison step is subsequently compared with the signal D.

After this third comparison, it is evident which signal lies the furthest back in time. In three successive steps, the delay times $\tau_i$ of the delay elements of the other respective signals are set. On the far left in FIG. 2, this is illustrated for the case where signal D lags the furthest. $\tau_A$ is first of all adjusted until the signals A' and D are in phase, then $\tau_B$ and, subsequently thereto, $\tau_C$ are correspondingly adjusted. To the right of this, the case where signal C lags the furthest is illustrated. In this case, $\tau_A$, $\tau_B$ and $\tau_D$ are correspondingly adjusted. To the right of this, the case is illustrated where signal B lags the furthest and, on the far right, the case where signal A lags the furthest. After the other three respective delay times $\tau_I$ have been set, the multiplexer of the circuit arrangement 11 is set to its switch position which is illustrated as the lowermost switch position in the representation. Consequently, the summation signals A+C and B+D are fed to the phase detector 14 in order to generate the track error signal TE. The setting operation of the delay elements 7 to 10 is thus concluded.

What is claimed is:

1. Device for reading from or writing to optical recording media, the device comprising:
    a detector having four detector areas for receiving a light beam reflected from an optical recording medium;
    first and second variable delay elements associated with respective first and second detector areas of the detector; and
    a phase detector having inputs respectively associated with outputs of the first and second variable delay elements and an output that provides a track error signal, wherein the first and second variable delay elements can be set independently of each other.

2. Device according to claim 1, further comprising a control means for setting one of the first and second variable delay elements.

3. Device according to claim 1, further comprising a phase detection means for detecting the phase angles of the signals emitted by the detector areas of the detector.

4. Device according to claim 1, further comprising a circuit arrangement for applying a variable combination of the output signals of the detector areas of the detector to a phase angle detector.

5. Device according to claim 4, wherein the phase angle detector is the phase detector of the device.

6. Device according to claim 5, further comprising a microcontroller, which controls the circuit arrangement and the setting of the first and second variable delay elements.

7. Device according to claim 5, wherein a low-pass filter is arranged at the output of the phase detector.

8. Device according to claim 1, characterized in that a delay element is assigned to at least three of the four areas.

9. Method for adjusting variable delay elements, which are able to be set, of a device for reading from and/or writing to optical recording media, each variable delay element being associated with a specific area of a photodetector of the device, the method comprising the steps of:
    in a first method step comparing the phase angle of the output signals emitted by the variable delay elements associated with the individual areas of the photodetector; and
    in a second method step altering the delay times of the variable delay elements until the phases of all the output signals coincide with the phase of the chronologically last output signal, and retaining the altered delay times as optimized set values of the device.

10. Method according to claim 9, in which the delay elements which are able to be set are set to a minimum delay time prior to the first method step.

11. Method according to claim 9, in which the photodetector comprises areas A, B, C, and D, and the phase of the signals of the areas A and B are first of all compared in the first method step and, if the phase of the signal of area A leads that of the area B, the phases of the signals of the areas B and C are compared, otherwise those of areas A and C are compared; if the phase of the signal of the area B and A, respectively, leads that of the area C, then the phase angles of the signals of the areas C and D are compared with one another, otherwise the phase of the signals of the areas B and A, respectively, is compared with that of the area D, the chronologically last signal being evident at the end of these comparisons, the other signals then being set to the phase angle of the chronologically last signal by altering the delay time of the delay elements in accordance with the second method step.

* * * * *